United States Patent [19]

Juras

[11] Patent Number: 4,531,844
[45] Date of Patent: Jul. 30, 1985

[54] THERMAL PROBE AND APPARATUS INCORPORATING THE SAME

[75] Inventor: Martin Juras, Dijon, France

[73] Assignee: Societe Bourguignonne de Mercanique, France

[21] Appl. No.: 677,895

[22] Filed: Dec. 4, 1984

Related U.S. Application Data

[63] Continuation of Ser. No. 434,240, Oct. 14, 1982, abandoned.

[30] Foreign Application Priority Data

Oct. 14, 1981 [FR] France .................. 81 19301

[51] Int. Cl.³ .................................................. G01K 1/00
[52] U.S. Cl. ..................................... 374/208; 374/120
[58] Field of Search ............ 374/2, 126, 208, 121, 374/132, 120; 250/338, 352; 126/422

[56] References Cited

U.S. PATENT DOCUMENTS

| | | | |
|---|---|---|---|
| 2,161,432 | 6/1939 | Rees | 374/208 |
| 2,799,758 | 7/1957 | Hutchins | 374/208 |
| 3,147,457 | 9/1964 | Gill et al. | 374/163 |
| 3,232,794 | 2/1966 | Korton | 374/179 |
| 3,238,778 | 3/1966 | Thompson et al. | 374/163 |
| 3,392,282 | 7/1968 | Astheimen | 374/126 |
| 3,935,032 | 1/1976 | Brandeberry et al. | 374/135 |
| 3,952,276 | 4/1976 | Walch et al. | 374/208 |
| 4,010,734 | 3/1977 | Chayet | 126/422 |
| 4,126,122 | 11/1978 | Bross | 126/422 |
| 4,168,626 | 9/1979 | Fullager | 374/158 |
| 4,256,089 | 3/1981 | Lewis et al. | 126/422 |

*Primary Examiner*—Charles Frankfort
*Assistant Examiner*—David R. Schuster
*Attorney, Agent, or Firm*—Darby & Darby

[57] ABSTRACT

A thermal probe permitting detection of the values of the "resultant" ambient temperature comprises a rigid supporting element made of heat-conductive material, a transducer rigidly attached to the support, in thermal contact with it, and an electric cable connected electrically to the said transducer. The support element has external characteristics as close as possible to those of a blackbody; for example, its outer surface is painted black. The transducer is placed on the inner surface of the support element, opposite the surface having the characteristics of a blackbody.

22 Claims, 1 Drawing Figure

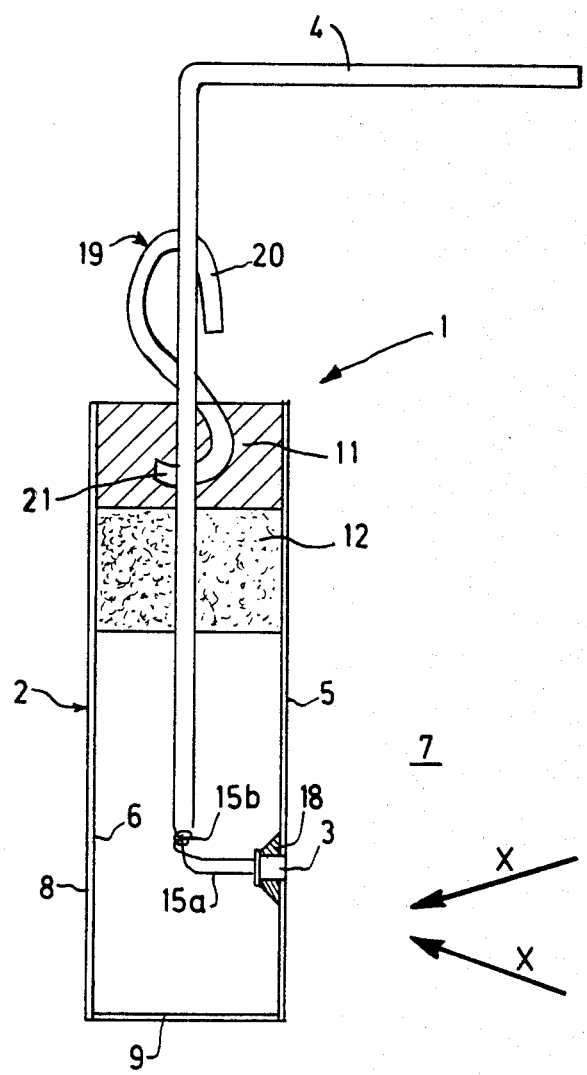

THERMAL PROBE AND APPARATUS INCORPORATING THE SAME

This is a continuation of application Ser. No. 434,240 filed Oct. 14, 1982 and now abandoned.

The invention concerns a thermal probe, more particularly a probe permitting registration of the "resultant" temperature of a heated locality, and its application to a heating installation.

Already familiar are numerous variants of thermal probes. In general, these probes are capable of giving a signal corresponding to the surrounding temperature. However, they cannot give a signal corresponding to the real value as perceived by the user. In fact, when a locality is heated to a temperature t, if a certain infrared radiation penetrates into the heated locality, current probes cannot give information on the energy of such infrared radiation, actually absorbed by the user.

Familiar, for example, are thermometers or rapid response probes used to take the temperature of patients. Such a probe is constituted by a thermistance placed in a bimetallic enclosure, namely a case, the thin wall of which is metallic, and is reinforced by a layer of a metal having a very high mechanical resistance. The interior metal has a greater thermal conductivity so that heat is transmitted very rapidly by conduction through the metal to the thermistance. These probes therefore utilize the principle of heat transmission by conduction. They are utilized to take the temperature of a live body in contact with the probe. However, they do not permit detection of temperature at a distance, nor detection of the "resultant" temperature, namely the sum of the thermal energy transmitted by convection by the air or surrounding atmosphere and by the infrared radiation present at the point where the measurement is made.

Also familiar are mechanisms for measurement of the temperature of patients comprising, instead of a thermistance, a transistor mounted on a plate, with a heating element disposed near the transistor to heat it with the goal of accomplishing calibration of the mechanism.

Such mechanisms do not permit measurement of the "resultant" temperature.

It follows that the familiar probes are not perfectly adapted to a regulation of great precision. This is very particularly true in the case of infrared heating installations, such as are utilized in particular in animal-raising centers.

The present invention is intended to remedy these drawbacks, and to this end it proposes a probe enabling detection of the "resultant" ambient temperature, with the probe comprising a rigid support element which is a good conductor of heat, and a transducer attached rigidly or not to the support, and in thermal contact with it or not, an electrical cable being connected electrically to the transducer. The support element has exterior characteristics as near as possible to those of a blackbody, for example, it is painted black. The transducer is placed on the inner surface of the support element, opposite that having the characteristics of a blackbody. It can also be situated inside the probe without being in contact with the support element. More particularly, the support element is metallic, and thus a good conductor of heat, and is presented, for example, in the form of a pseudo-cylindrical tube, particularly of aluminum.

The thermal probe according to the invention thus permits registration of the ambient temperature, and possibly of the energy of the infrared radiation emitted by the heating apparatus. Because the infrared radiation is absorbed by the support element having qualities near those of a blackbody the infrared waves striking the black body are thus absorbed by it, and transformed into calorific energy, and then transmitted through the metallic wall of the support element, which is a good conductor of heat. The temperature registered by the transducer is thus essentially the "resultant" temperature, that is, the sum of the thermal energy corresponding to the temperature prevailing in the atmosphere in which the probe is immersed, and the energy of the infrared radiation striking the probe.

The following description with regard to the drawing attached by way of non-limitational example will enable better understanding of how the present invention can be put into practice.

The single FIGURE is a schematic view of a thermal probe according to the invention.

The thermal probe 1 represented in the schematic comprises a rigid support element 2, a transducer 3 connected rigidly to the support element 2, and in thermal contact with it. Preferably, the transducer 3 is a transducer permitting transformation of the temperature into an electrical signal. More particularly, this electrical signal is a current or a voltage. Preferably, a transducer is used which is not subject to disturbance, and is insensitive to external atmospherics, and is independent of the length of the cable. This enables faithful representation of the temperature.

The thermal probe 1 comprises in addition a shielded electrical cable 4 connected electrically to the transducer 3.

The support element 2 has external qualities as near as possible to those of a blackbody, in order to absorb as well as possible any infrared radiation. For example, this element can include an outer surface painted black.

The transducer 3 is placed on the inner surface 6 of the support ellement 2 opposite to that presenting the characteristics of a blackbody. However, in another form of realization not represented, it can be situated within the probe without being in contact with the support element 2. It may also be not rigidly attached to the support 2.

More particularly, the support element is presented in the form of a tube, a good conductor of heat, for example metallic, especially of aluminum. Thus, the infrared radiation X emitted at the exterior 7 of the tube is absorbed totally by the exterior surface 5 of the wall 8 which is painted black, and this radiation is transmitted through this wall 8 to its inner surface 6, since the constituent material of the support 2 is a good conductor of heat, for example a metal. The transducer 3, being placed on the inner surface 6 of the tube 2, collects the sum of the ambient thermal energy and the energy emitted by the infrared radiation and captured by the tube, and it transforms this value into electrical variables. More particularly, it transforms the "resultant" temperature value into a variable of current intensity.

The tube 2 is more particularly a pseudo-cylindrical tube with circular perpendicular cross section. It is closed at its lower end 9, preferably by a metal plate which is welded or glued. The transducer 3 is attached to the lateral surface of the support element 2, in a position separated from the end 9. It can be attached to the interior of the tube, on the part 9 closing the end of the tube. The transducer 3 is attached to the inner surface 6 of the tube 2 by a thermoconductive resin forming the joint 18.

The end 10 of the tube 2 opposite the end 9 is closed by a plug 12, for example of expanded polystyrene. This plug 12 has the function of holding the cable 4 coaxial to the pseudo-cylindrical tube 2.

The thermal probe comprises in addition a hanger element enabling it to be attached to a support. This hanger element 19 is in particular an S hook, whose one bent end 20 is situated at the exterior of the support element 2, and whose other end 21, also bent, is dipped in a resin 11. This resin 11 flows directly onto the plug 12, this plug 12 having the function of preventing losses of resin as it is cast. The resin 11 thus holds the hook 19 and the cable 4 in position. The cable 4 is a shielded cable whose central conductor 15a is connected to the conductor 3, and whose helical conductor 15b is also connected to the transducer 3. The cable 4 can be connected to the probe body 2 by a detachable connector situated particularly at the end of the cable 4 which is located within the probe body 2.

The transducer 3 is thus perfectly insulated within the support element 2, which forms a sealed tube. The transducer 3 is placed within the sealed portion formed by the lateral wall 8 of the tube, the closed end 9 of the tube, and the plug 12.

The probe according to the invention thus enables detection of the ambient temperature prevailing at the exterior 7 of the probe as well as the infrared radiation X impinging on the probe. The probe is utilized particularly to measure the heat perceived by animals or living organisms placed in an enclosure heated by infrared radiation. When the infrared strikes the probe, the probe collects the values of the ambient temperature and the energy of the infrared radiation. When the infrared radiation is not emitted, the probe collects only the values of the ambient temperature.

I claim:

1. A thermal probe for sensing the resultant ambient temperature produced by the combined effects of thermal convection and infrared radiation at the sight of said probe, said probe comprising:

a rigid support element in the form of an enclosure, said enclosure having an internal surface exhibiting good thermal conductivity and an exterior surface closely approximating the properties of a blackbody so as to absorb said infrared radiation and respond to the effects of said thermal convection;

thermal transducer means mounted within said enclosure so as to be thermally coupled to the interior surface thereof, said transducer providing an electrical signal related to the resultant ambient temperature, and means for coupling said electrical signal from said transducer externally of said enclosure.

2. A probe according to claim 1 wherein the transducer is placed on the internal surface of the support element.

3. A probe according to claim 1 wherein the transducer is connected rigidly to the support element and in thermal contact with it.

4. A probe according to claim 1 wherein the transducer is not connected rigidly to the support element.

5. A probe according to claim 1 wherein the transducer is situated within the probe, but is not in contact with the support element.

6. A probe according to claim 1 wherein the support element has the form of a pseudo-cylindrical tube, with a circular perpendicular cross section and is made of metal.

7. A probe according to claim 6 further comprising a plate, a plug, and a hardened resin, the support element being closed at one end by said plate and at its opposite end by said plug, said plug supporting said hardened resin.

8. A probe according to claim 7 wherein the transducer is attached to said internal surface in spaced-apart relation to said one end.

9. A probe according to claim 7 wherein the transducer is attached to said plate.

10. A probe according to claim 1 further comprising a hanger element for hanging said probe.

11. A probe according to claim 1 wherein said coupling means comprises a cable and a detachable connector connecting said cable to said probe.

12. A probe according to claim 1 in combination with a heating apparatus.

13. A probe according to claim 2 wherein the transducer is placed on the internal surface of the support element, opposite the surface presenting the characteristics of a black body.

14. A probe according to claim 2 wherein the transducer is not connected rigidly to the support element.

15. A probe according to claim 2 wherein the transducer is situated within the probe, but is not in contact with the support element.

16. A probe according to claim 2 wherein the support element has the form of a pseudo-cylindrical tube, with a circular perpendicular cross section and is made of metal.

17. A probe according to claim 16 further comprising a plate, a plug, and a hardened resin,, the support element being closed at one end by said plate and at its opposite end by said plug, said plug supporting said hardened resin.

18. A probe according to claim 17 wherein the transducer is attached to said internal surface in spaced-apart relation to said one end.

19. A probe according to claim 17 wherein the transducer is attached to said plate.

20. A probe according to claim 2 further comprising a hanger element for hanging said probe.

21. A probe according to claim 2 wherein said coupling means comprises a cable and a detachable connector connecting said cable to said probe.

22. A probe according to claim 2 in combination with a heating apparatus.

* * * * *